No. 715,342. Patented Dec. 9, 1902.
P. T. BERTHOLF.
FISH HOOK.
(Application filed June 9, 1902.)
(No Model.)

Inventor
P. T. Bertholf

Witnesses

By
Attorneys

THE NORRIS PETERS CO., PHOTO-LITHO., WASHINGTON, D. C.

UNITED STATES PATENT OFFICE.

PSALM T. BERTHOLF, OF LOCH SHELDRAKE, NEW YORK.

FISH-HOOK.

SPECIFICATION forming part of Letters Patent No. 715,342, dated December 9, 1902.

Application filed June 9, 1902. Serial No. 110,872. (No model.)

*To all whom it may concern:*

Be it known that I, PSALM T. BERTHOLF, a citizen of the United States, residing at Loch Sheldrake, in the county of Sullivan and State of New York, have invented certain new and useful Improvements in Fish-Hooks; and I do declare the following to be a full, clear, and exact description of the invention, such as will enable others skilled in the art to which it appertains to make and use the same.

The invention relates to fish-hooks.

The object of the invention is to provide a fish-hook which shall be simple of construction, durable in use, and comparatively inexpensive of production and which will be automatically operated by the fish in grasping the bait-hook to liberate the impaling-hooks, which will bury themselves into the head or body of the fish, and thus insure its capture.

With these and other objects in view the invention consists in certain novel features of construction, combination, and arrangement of parts which will be hereinafter more fully set forth, and particularly defined in the appended claims.

Figure 1:
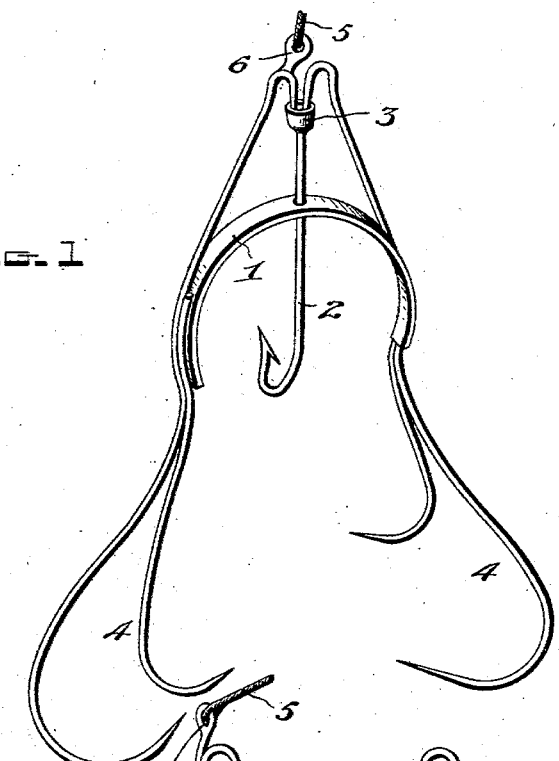
Figure 2:
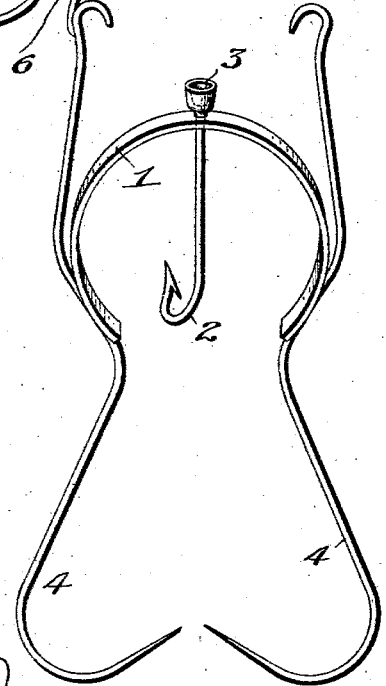

In the accompanying drawings, Figure 1 is a perspective view of one form of my invention, showing the device set; and Fig. 2 is a similar view of another and simpler form of my invention, showing the impaling-hooks in the position they assume after they have been sprung.

Referring to the drawings, 1 denotes a spring-frame in the form of a bow-spring, in which is mounted intermediate the ends of the frame to slide longitudinally a bait-hook 2, provided at its upper end with a catch 3, preferably in the shape of a metal cup, as shown in the drawings.

4 denotes impaling-hooks, which are secured intermediate their ends to the ends of the bow-spring frame and have their lower hooked ends projecting toward each other and their upper ends shaped to engage and be held in close relation by the catch. As shown, the upper ends are formed with inwardly and downwardly projecting hooks, which when the upper ends of the impaling-hooks are compressed will permit of their being engaged by the cup by moving the bait-hook slightly upwardly, and when so engaged by the cup it is evident that the upper ends of said impaling-hooks will be locked and the lower ends of said impaling-hooks be spread apart. The fish-line 5 may be attached to the device in any suitable manner. As shown, I provide the upper end of one of the impaling-hooks with an eye 6.

In Fig. 1 I have shown each end of the spring-frame provided with two hooks, while in Fig. 2 I have shown each end of the frame provided with one hook. The impaling-hooks shown in Fig. 1 are arranged in different vertical planes—that is to say, one impaling-hook at each end of the spring-frame is arranged above the other impaling-hook.

I would have it understood that I do not restrict myself in the number of impaling-hooks used or their arrangement and location with respect to each other, but reserve to myself the right to make such changes in the number of hooks used, their size, and their arrangement as I may desire without departing from the spirit of the invention.

In the operation of the device, assuming the parts to be in the position shown in Fig. 1 or "set" and the bait-hook baited, as soon as the fish makes a strike it will draw upon the bait-hook, release the cup at the end thereof, and permit the impaling-hooks to spring inwardly and bury themselves into the head or body of the fish, and thus insure its capture.

From the foregoing description, taken in connection with the accompanying drawings, the construction, operation, and advantages of my invention will be readily apparent without requiring a more extended explanation.

Various changes in the form, proportion, and minor details of construction may be resorted to without departing from the principle or sacrificing any of the advantages of my invention.

Having thus fully described my invention, what I claim as new, and desire to secure by Letters Patent, is—

1. The combination with a spring-frame, of a bait-hook loosely connected thereto and provided with a catch, and impaling-hooks connected to said frame and adapted to be held in set position by the catch and upon the withdrawal of the catch to spring toward each other and bury themselves in the fish, substantially as set forth.

2. The combination with a bow-spring, of impaling-hooks secured thereto and provided with upwardly-projecting arms having hooks at their upper ends, and a bait-hook mounted to move longitudinally in the bow-spring and provided with a cup adapted to receive the upper hooked ends of the arms and hold the impaling-hooks apart, substantially as set forth.

In testimony whereof I have hereunto set my hand in presence of two subscribing witnesses.

PSALM T. BERTHOLF.

Witnesses:
GEO. MESLER,
J. L. MATZINGER.